United States Patent
Tanriover et al.

(10) Patent No.: US 11,528,275 B2
(45) Date of Patent: Dec. 13, 2022

(54) AUTONOMOUS/SEMI-AUTONOMOUS DRIVING METHOD AND APPARATUS WITH TRUSTED DATA COLLECTION, RETENTION AND/OR SHARING

(71) Applicant: Intel Corporation, Santa Clara, CA (US)

(72) Inventors: Cagri Tanriover, Bethany, OR (US); Dave Cavalcanti, Portland, OR (US); Hassnaa Moustafa, Portland, OR (US); Robert Firby, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 463 days.

(21) Appl. No.: 16/611,354

(22) PCT Filed: Jun. 30, 2017

(86) PCT No.: PCT/US2017/040349
§ 371 (c)(1),
(2) Date: Nov. 6, 2019

(87) PCT Pub. No.: WO2019/005119
PCT Pub. Date: Jan. 3, 2019

(65) Prior Publication Data
US 2020/0169564 A1 May 28, 2020

(51) Int. Cl.
*H04L 9/40* (2022.01)
*B60W 60/00* (2020.01)
(Continued)

(52) U.S. Cl.
CPC ..... *H04L 63/102* (2013.01); *B60W 60/00188* (2020.02); *G06Q 10/02* (2013.01);
(Continued)

(58) Field of Classification Search
CPC .............. H04L 63/0861; H04L 63/102; H04L 63/0853; H04L 63/083; H04L 63/107
See application file for complete search history.

(56) References Cited

U.S. PATENT DOCUMENTS 9,648,107 B1 * 5/2017 Penilla ................ G06F 3/04886
9,971,348 B1 * 5/2018 Canavor ............. H04W 12/068
(Continued)

FOREIGN PATENT DOCUMENTS

EP 2447905 A1 5/2012

OTHER PUBLICATIONS

C. Huang, R. Lu, X. Lin and X. Shen, "Secure Automated Valet Parking: A Privacy-Preserving Reservation Scheme for Autonomous Vehicles," in IEEE Transactions on Vehicular Technology, vol. 67, No. 11, pp. 11169-11180, Nov. 2018. (Year: 2018).*

(Continued)

*Primary Examiner* — Kari L Schmidt
(74) *Attorney, Agent, or Firm* — Schwabe, Williamson & Wyatt, P.C.

(57) ABSTRACT

Apparatus, method and computer readable medium associated with autonomous/semi-autonomous driving are disclosed herein. In embodiments, an apparatus for autonomous/semi-autonomous driving may comprise a management system to be disposed in an autonomous/semi-autonomous vehicle. The management system may include a reservation subsystem to receive, from a cloud server, a reservation of the autonomous or semi-autonomous vehicle for a passenger or a driver, and an access control subsystem to control access to the autonomous or semi-autonomous vehicle that includes a trust function to gain trust of the passenger or driver with respect to the passenger or driver's data privacy requirements will be met, when the passenger (Continued)

or driver attempts to exercise the reservation. Other embodiments may be disclosed or claimed.

24 Claims, 7 Drawing Sheets

(51) Int. Cl.

| | |
|---|---|
| *G06Q 10/02* | (2012.01) |
| *G06Q 50/30* | (2012.01) |
| *G10L 17/00* | (2013.01) |
| *G06V 40/12* | (2022.01) |
| *G06V 40/16* | (2022.01) |

(52) U.S. Cl.
CPC ........... *G06Q 50/30* (2013.01); *H04L 63/083* (2013.01); *H04L 63/0853* (2013.01); *H04L 63/0861* (2013.01); *G06Q 2240/00* (2013.01); *G06V 40/12* (2022.01); *G06V 40/16* (2022.01); *G10L 17/00* (2013.01)

(56) References Cited

U.S. PATENT DOCUMENTS

| | | | | |
|---|---|---|---|---|
| 10,530,646 | B1* | 1/2020 | Hecht | H04L 41/0813 |
| 2011/0112969 | A1* | 5/2011 | Zaid | G07C 9/00571 |
| | | | | 701/2 |
| 2011/0191126 | A1* | 8/2011 | Hampshire | G06Q 10/02 |
| | | | | 705/5 |
| 2013/0212659 | A1* | 8/2013 | Maher | G05D 1/0022 |
| | | | | 726/6 |
| 2013/0317693 | A1 | 11/2013 | Jefferies et al. | |
| 2014/0129113 | A1 | 5/2014 | Van Wiemeersch et al. | |
| 2014/0298023 | A1* | 10/2014 | Oppermann | G06F 21/60 |
| | | | | 713/168 |
| 2015/0126143 | A1* | 5/2015 | Van Wiemeersch | H04B 1/16 |
| | | | | 455/182.2 |
| 2016/0104486 | A1* | 4/2016 | Penilla | G10L 15/22 |
| | | | | 704/232 |
| 2016/0125199 | A1* | 5/2016 | Lee | G06F 21/316 |
| | | | | 726/28 |
| 2016/0198002 | A1 | 7/2016 | Penilla et al. | |
| 2017/0091856 | A1 | 3/2017 | Canberk et al. | |
| 2017/0132157 | A1* | 5/2017 | Makke | G06F 12/1408 |
| 2017/0316533 | A1* | 11/2017 | Goldman-Shenhar | |
| | | | | H04L 67/306 |
| 2018/0137264 | A1* | 5/2018 | Kurian | H04L 67/12 |
| 2018/0204399 | A1* | 7/2018 | Newman | G07C 9/28 |
| 2018/0290628 | A1* | 10/2018 | Luke | B60R 25/209 |
| 2018/0351946 | A1* | 12/2018 | Forest | H04W 12/06 |
| 2019/0047514 | A1* | 2/2019 | Brombach | B60R 25/23 |
| 2019/0096021 | A1* | 3/2019 | Jarvis | G06Q 20/4012 |
| 2019/0168711 | A1* | 6/2019 | Oesterling | B60Q 9/00 |
| 2022/0014353 | A1* | 1/2022 | Lim | H04W 4/80 |

OTHER PUBLICATIONS

I. Symeonidis, M. A. Mustafa and B. Preneel, "Keyless car sharing system: A security and privacy analysis," 2016 IEEE International Smart Cities Conference (ISC2), 2016, pp. 1-7. (Year: 2016).*

Plappert, Christian, Lukas Jäger, and Andreas Fuchs. "Secure Role and Rights Management for Automotive Access and Feature Activation." Proceedings of the 2021 ACM Asia Conference on Computer and Communications Security. 2021, pp. 227-241. (Year: 2021).*

Extended European Search Report dated Oct. 30, 2020 for European Patent Application No. 17916352.2, 7 pages.

Examination Report dated Dec. 7, 2021 for European Patent Application No. 17916352.2, 7 pages.

International Search Report and Written Opinion dated Mar. 9, 2018 for International Patent Application No. PCT/US2017/040349, 17 pages.

* cited by examiner

AUTONOMOUS/SEMI-AUTONOMOUS DRIVING METHOD AND APPARATUS WITH TRUSTED DATA COLLECTION, RETENTION AND/OR SHARING

CROSS REFERENCE TO RELATED APPLICATIONS

The present application is a national phase entry under 35 U.S.C. § 371 of International Application No. PCT/US2017/040349, filed Jun. 30, 2017, entitled "AUTONOMOUS/SEMI-AUTONOMOUS DRIVING METHOD AND APPARATUS WITH TRUSTED DATA COLLECTION, RETENTION AND/OR SHARING", which designated, among the various States, the United States of America, the contents of the PCT/US2017/040349 application is hereby incorporated by reference herein in its entirety for all purposes.

TECHNICAL FIELD

The present disclosure relates to the field of autonomous/semi-autonomous driving. In particular, the present disclosure is related to autonomous/semi-autonomous driving apparatus and method with trusted data collection, retention and/or sharing, between autonomous/semi-autonomous vehicles and their passengers/drivers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A key value proposal of autonomous/semi-autonomous vehicles is to enable the benefits of a personalized commute experience as a service without the need of vehicle ownership. For companies to offer this service at affordable costs, they will likely want to collect a comprehensive amount of data related to the passengers and/or the drivers both for their own use as well as for selling it to third parties, such as insurance companies (e.g., to adjust premium payments to reward good drivers), transportation agencies (e.g., to identify route usage of drivers and passengers to plan maintenance and infrastructure planning) and vehicle manufacturers (e.g., to identify infotainment features preferred by the driver and the passengers etc.). The collected data may include location information, points of interest, routes, time of use, etc.

Because the shared data is sensitive and personal to the passenger or driver, for this model to work, the passenger or driver will likely need reassurance on some or all of the following key concerns:

1—Is the company collecting my personal data trustworthy?
2—What type of data will be captured?
3—Who will have access to my data?
4—How long will my data persist once I share it?

If the above data privacy concerns are not addressed, "personalized commute as a service" model using autonomous/semi-autonomous vehicles of the future will not be as disruptive, as a result of which the transportation industry, the public and the environment will not be able to fully benefit.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
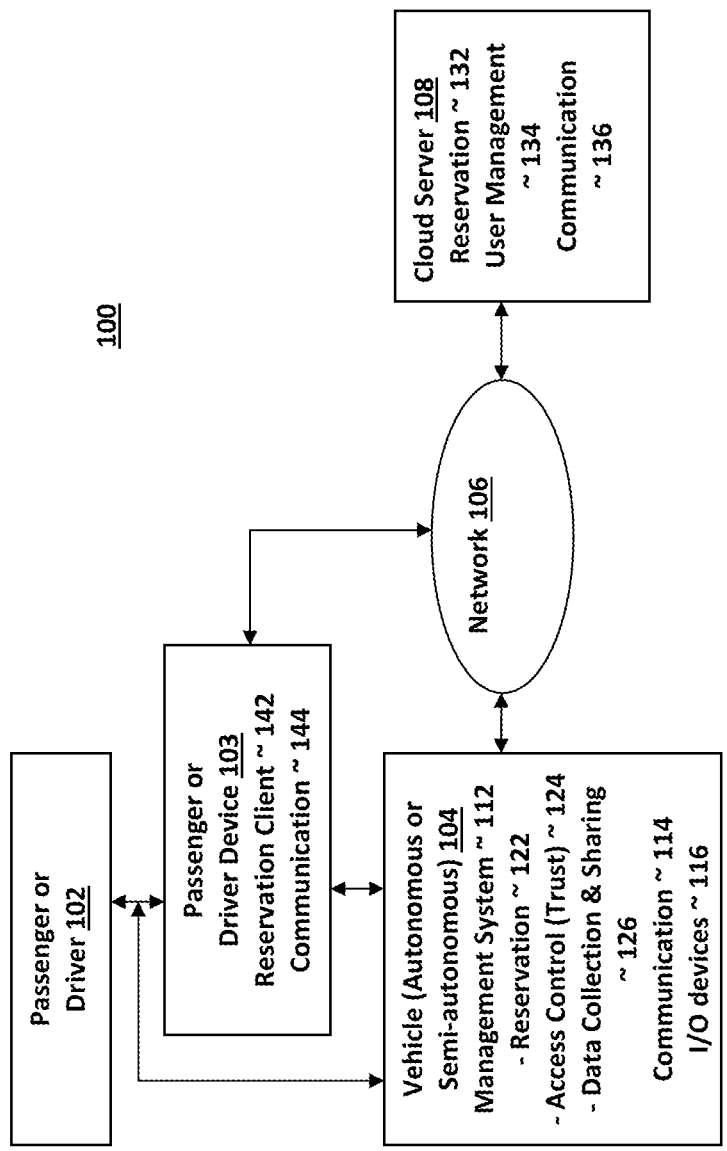
FIG. 1 illustrates an overview of an autonomous/semi-autonomous driving system with trusted data collection, retention, and/or sharing, in accordance with various embodiments.

Apparatus, method and computer readable medium associated with autonomous/semi-autonomous driving are disclosed herein. The present disclosure provides for methods and apparatus for autonomous/semi-autonomous driving that are based on mutual trust establishment and a straightforward way of empowering the passengers and drivers to specify what type of information a vehicle and mobility service providers can capture during a ride, with whom that data can be shared and for how long that data is allowed to persist.

In embodiments, an apparatus for autonomous/semi-autonomous driving may comprise a management system to be disposed in an autonomous/semi-autonomous vehicle. The management system may include a reservation subsystem to receive, from a cloud server, a reservation of the autonomous or semi-autonomous vehicle for a passenger or a driver, and an access control subsystem to control access to the autonomous or semi-autonomous vehicle that includes a trust function to gain trust of the passenger or driver with respect to the passenger or driver's data privacy requirements will be met, when the passenger or driver attempts to exercise the reservation.

In embodiments, a cloud server may comprise a communication subsystem to communicate with passengers or drivers, and autonomous or semi-autonomous vehicles; a reservation subsystem coupled with the communication subsystem to manage reservations of the autonomous or semi-autonomous vehicles by the passengers or drivers, that includes generation and provision of expected passcodes for the passengers or drivers for respective reservations for use by the autonomous or semi-autonomous vehicles to establish trust with the passengers or drivers with respect to meeting data privacy requirements of the passengers or drivers; and a user management subsystem coupled with the communication subsystem to manage the data privacy requirements of the passengers or drivers that includes provision of the data privacy requirements of the passengers or drivers to respective reserved autonomous or semi-autonomous vehicles. The respective reserved autonomous or semi-autonomous vehicles use the provided data privacy requirements to regulate collection and sharing of data associated with the passengers or drivers.

In embodiments, a client device for autonomous or semi-autonomous driving may comprise a processor; and a reservation client operated by the processor to provide data privacy preferences of a passenger or a driver to a cloud server.

These and other aspects will be further described below. In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The terms "motor" and "engine" are synonymous unless the context clearly indicates otherwise.

As used hereinafter, including the claims, the term "autonomous/semi-autonomous vehicle" may refer to any one of assisted park vehicles, automated drive and park vehicles or fully automated navigate/park vehicles. Assisted park vehicles may be vehicles of current generation with advance driver assistance system (ADAS) having driver assistance functions (also referred to as computer-assisted driving). Automated drive and park vehicles may be vehicles of current or future generation with ADAS having self-driving or auto-pilot capabilities (i.e. without human driver), and fully automated navigate/park vehicles may be vehicles of a future generation with ADAS having autonomous driving capabilities where the passenger can be dropped off at a destination, and the vehicle can go park itself.

The term "module" may refer to, be part of, or include an Application Specific Integrated Circuit (ASIC), an electronic circuit, a programmable combinational logic circuit (such as a Field Programmable Gate Array (FPGA)), a processor (shared, dedicated, or group) and/or memory (shared, dedicated, or group) that execute one or more software or firmware programs having one or more machine instructions (generated from an assembler or from a high level language compiler), and/or other suitable components that provide the described functionality.

Referring now to FIG. 1, wherein an overview of an autonomous/semi-autonomous driving system with trusted data collection, retention, and/or sharing, in accordance with various embodiments, is shown. As illustrated, autonomous/semi-autonomous driving system 100 may include one or more autonomous/semi-autonomous vehicles 104 and one or more cloud servers 108, communicatively coupled with each other via network 106. Passengers (in fully autonomous embodiments) or drivers (in semi-autonomous embodiments) 102 may interact with autonomous/semi-autonomous vehicle(s) 104 and cloud server(s) 108 via passenger or driver devices 103 (which may also be referred to below as client devices 103). In embodiments, passengers or drivers 102 may also interact at least in part with autonomous/semi-autonomous vehicle(s) 104 directly. In embodiments, operator(s) of cloud server(s) 108 may be the provider of autonomous/semi-autonomous vehicle(s) 104. In other embodiments, operator(s) of cloud server(s) 108 and the provider(s) of autonomous/semi-autonomous vehicle(s) 104 may be different parties.

Autonomous/semi-autonomous vehicle(s) 104 and cloud server(s) 108 may be incorporated with autonomous/semi-autonomous driving technology of the present disclosure that includes trusted data collection, retention, and sharing. That is, autonomous/semi-autonomous vehicle(s) 104 and cloud server(s) 108 may be incorporated with autonomous/semi-autonomous driving technology of the present disclosure that collect, retain and/or share data in compliance with the data privacy requirements of passengers/drivers 102. Further, autonomous/semi-autonomous vehicle(s) 104 and cloud server(s) 108 may be incorporated with autonomous/semi-autonomous driving technology of the present disclosure that enables passengers/drivers 102 of autonomous/semi-autonomous vehicle(s) 104 to trust their data privacy requirements with respect to data collection, retention, and sharing will be met/honored by autonomous/semi-autonomous vehicle(s) 104 and cloud server(s) 108.

In embodiments, an autonomous/semi-autonomous vehicle 104 may include management system 112, which may include reservation subsystem 122, access control subsystem 124, and data collection and sharing subsystem 126. Reservation subsystem 122 may be configured to facilitate a passenger/driver 102 in exercising (directly or via a client device 103) a reservation of the autonomous/semi-autonomous vehicle 104 hosting management system 112 (i.e., the autonomous/semi-autonomous vehicle 104 where management system 112 is disposed on-board). The access control subsystem 124 may be configured to control access to the host autonomous/semi-autonomous vehicle 104. In embodiments, the access control subsystem 124 may include a trust function configured to gain trust of the passenger or driver 102 with respect to the passenger or driver's data privacy requirements will be met/honored, when the passenger or driver 102 attempts to exercise the reservation with the host autonomous/semi-autonomous vehicle 104. Data collection and sharing subsystem 126 may be configured to collect, retain, and share data associated with passenger or driver's usage of the host autonomous/semi-autonomous vehicle 104, in compliant with the data privacy requirements of the passenger or driver 102.

In embodiments, a reservation subsystem 122 may be configured to receive, from cloud server(s) 108, reservations of the host autonomous/semi-autonomous vehicle 104 by passengers/drivers 102. Each reservation may include data about the destination of the particular reservation, time of the particular reservation, pick up location of the particular reservation, duration of the particular reservations, and/or a reference identifier of the particular reservation.

In embodiments, the trust function of the access control subsystem 124 may be configured to generate and provide an expected passcode to a passenger/driver 102, in response to the passenger/driver's attempt to exercise a reservation. The expected passcode may be unique for the particular reservation. Generation and provision of the expected passcode to a passenger/driver 102 demonstrates to the passenger/driver 102, the autonomous/semi-autonomous vehicle 104 may be trusted with respect to complying or honoring the data privacy requirements of the passenger/driver 102.

In embodiments, a reservation subsystem 122 may be further configured to provide cloud server(s) 108 with a unique signature of the host autonomous/semi-autonomous vehicle 104 at the time a reservation for the host autonomous/semi-autonomous vehicle 104 is made by a passenger/driver 102. The unique signature of the host autonomous/semi-autonomous vehicle 104 may be used by cloud server(s) 108 in generating and providing the passenger/driver 102 with the expected passcode to be provided by the autonomous/semi-autonomous vehicle 104, when the passenger/driver 102 exercises the reservation, to demonstrate to the passenger/driver 102 that the autonomous/semi-autonomous vehicle 104 can be trusted in meeting the data privacy requirements of the passenger/driver 102.

In embodiments, access control subsystem 124 may be further configured to collect and provide cloud server(s) 108 with bio-metric data of a passenger/driver 102 exercising a reservation for the host autonomous/semi-autonomous vehicle 104, to facilitate affirmative identification of the passenger/driver 102 by cloud server(s) 108.

In embodiments, data collection and sharing subsystem 126 may be configured to receive, from cloud server(s) 108, a data privacy profile of a passenger/driver 102 exercising a reservation of the host autonomous/semi-autonomous vehicle 104. The data privacy profile may be provided by cloud server(s) 108, in response to confirmation of the identity of the passenger/driver 102, based at least in part on the bio-metric data of the passenger/driver 102, received. In embodiments, the bio-metric data may include a photo, fingerprint, voice print or the like of the passenger/driver 102.

In embodiments, reservation subsystem 122, access control subsystem 124 and data collection and sharing subsystem 126 may be implemented in hardware, software or combination thereof. Hardware implementations may include Application Specific Integrated Circuits (ASIC), programmable circuits, such as Field Programmable Gate Arrays (FPGA), and so forth. For software implementations, management system 112 may further include a processor with one or more cores, memory and other associated circuitry (not shown), and reservation subsystem 122, access control subsystem 124 and/or data collection and sharing subsystem 126 may be implemented in assembler language supported by the processor, or any programmable language that can be compiled into machine codes executable by the processor.

In embodiments, as illustrated, an autonomous/semi-autonomous vehicle 104 may further include communication subsystem 114 to communicate with cloud server(s) 108, and one or more input/output (I/O) devices 116 to facilitate interactions with passengers/drivers 102 directly or via client device(s) 103. Communication subsystem 114 and I/O devices 116 may be operationally coupled with management system 112. Communication subsystem 114 may be one or more of a wide range of communication subsystems know in the art including, but are not limited to, WiFi communication subsystems, 4G/5G/LTE cellular communication subsystems, satellite communication subsystems, Bluetooth® communication subsystems, Near Field Communication (NFC) subsystems, and so forth. I/O devices 116 may include e.g., one or more display screens (e.g., touch sensitive display screens). I/O devices 116 may further include a camera, a fingerprint reader or a voice recorder to respectively capture a photo, fingerprints or voice prints of a passenger/driver 102.

In embodiments, an autonomous/semi-autonomous vehicle 104 may be equipped with other components, e.g., a navigation system, global positioning system (GPS), and so forth (not shown).

Continuing to refer to FIG. 1, in embodiments, cloud server(s) 108 may (collectively) include reservation subsystem 132, user management subsystem 134 and communication subsystem 136 communicatively coupled with reservation subsystem 132 and user management subsystem 134. Reservation subsystem 132 may be configured to manage reservations of autonomous/semi-autonomous vehicles 104 by passengers/drivers 102. In particular, reservation subsystem 132 may be configured to maintain a database (not shown) of the autonomous/semi-autonomous vehicles, including their types (e.g., compact, standard, sport utility, etc.), associated signatures, reservations, availability, usage, maintenance, and so forth. Further, reservation subsystem 132 may be configured to generate and provide passengers/drivers 102 with the expected passcodes (for cloud server(s) 108) to be provided by the reserved autonomous/semi-autonomous vehicles 104, when passengers/drivers 102 exercise their reservations, thereby enabling passengers/drivers 102 to trust their data privacy requirements will be met by the autonomous/semi-autonomous vehicles 104 and cloud server(s) 108.

In embodiments, reservation subsystem 132 may also be configured to receive bio-metric data of passengers/drivers 102 exercising reservations of autonomous/semi-autonomous vehicles 104, to confirm identities of the passengers/drivers 102. In embodiments, reservation subsystem 132 may be further configured to provide the data privacy profiles of passengers/drivers 102 to autonomous/semi-autonomous vehicles 104 (for cloud server(s) 108), on confirmation of the identities of the passengers/drivers 102.

In embodiments, user management subsystem 134 may be configured to register the passengers/drivers 102. User management subsystem 134 may facilitate collection and storage of details about the passengers/drivers 102, e.g., their names, addresses, demographic data, credit card and/or banking information, photos, fingerprints, voice prints, and so forth. User management subsystem 134 may create, maintain and terminate accounts of passengers/drivers 102. In embodiments, user management subsystem 134 may be further configured to collect data privacy requirements of passengers/drivers 102, and maintain data privacy profiles based on the data privacy requirements collected. In embodiments, user management subsystem 134 may also be configured to collect, retain, and/or share vehicle usage related data of passengers/drivers 102.

In embodiments, data privacy requirements may include whether certain data associated with a passenger/driver 102 may be collected, accessed and/or shared. Examples of such data may include, but are not limited to demographic data, in-cabin visual data, in-cabin audio data, location and route data, in-cabin infotainment usage data, and/or in-cabin comfort preferences. An example of permissible or impermissible access may include, but is not limited, access by the service provider(s) of autonomous/semi-autonomous vehicles 104. Examples of permissible or impermissible sharing may include, but are not limited, sharing with vehicle manufacturers, transportation agencies, academic institutions, research organizations, and so forth. In embodiments, data privacy requirements may further include valid time period of the collection, access and/or sharing authorizations, that is, the duration of collected data may be retained and made available. (See also FIG. 3, to be further described.)

In embodiments, communication subsystem 136 may be configured to facilitate communication with autonomous/semi-autonomous vehicles 104 and client device(s) 103. Similar to communication subsystem 114, communication subsystem 136 may be one or more of a wide range of communication subsystems know in the art including, but are not limited to, WiFi communication subsystems, 4G/5G/LTE cellular communication subsystems, satellite communication subsystems, and so forth.

In embodiments, each cloud server 108 may further include a processor with one or more cores, memory and other associated circuitry, e.g., hardware accelerators (not shown), and reservation subsystem 132, and user management subsystem 126 may be implemented in software, with or without hardware acceleration. More specifically, reservation subsystem 132, and user management subsystem 126 may be implemented in assembler language supported by the processor, or any programmable language that can be compiled into machine codes executable by the processor, and/or bitstreams to program hardware accelerators (if employed). Examples of hardware accelerators may include, but are not limited to, FPGA.

In embodiments, reservation subsystem 132 and user management subsystem 134 may be provided from a common (cluster of) cloud server(s) 108 operated by a common operator. In alternate embodiments, reservation subsystem 132 and user management subsystem 134, or even portion of the functions, may be provided from different (clusters of) cloud servers 108 operated by different operators.

Still referring to FIG. 1, in embodiments, each client device 103 may include reservation client 142. In some embodiments, e.g., where client device 103 is a computing tablet, a laptop computer or a desktop computer having a processor with one or more cores, memory and associated circuitry (not shown), reservation client 142 may be a generic agent, such as a browser. In other embodiments, e.g., where client device 103 is a wearable device or a smartphone, also having a processor with one or more cores, memory and associated circuitry (not shown), reservation client 142 may be a downloaded application.

In embodiments, network 106 may be any one of a number of public/private, wired/wireless, local and/or wide area networks known in the art, including the Internet, having a number of routers, switches, gateways, base stations, and so forth, coupled with each other.

Figure 2:
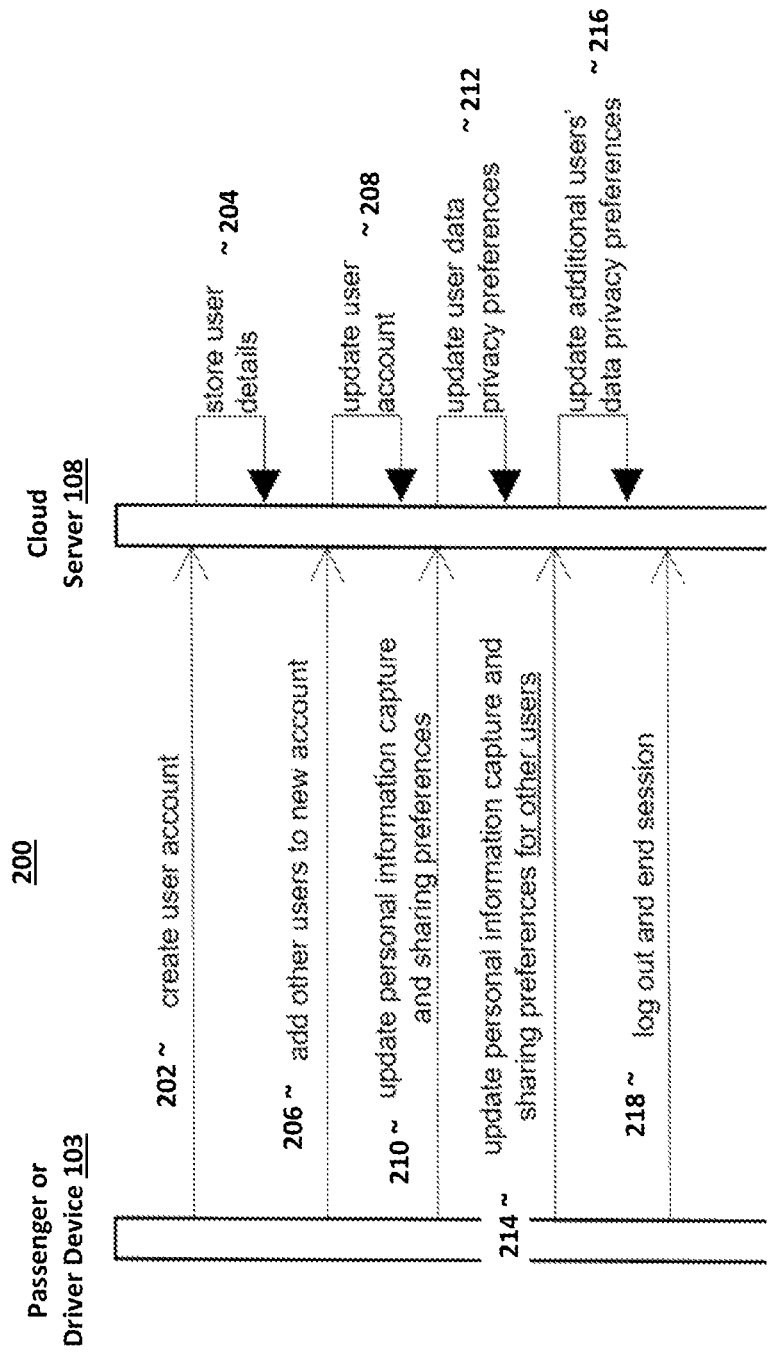
FIG. 2 illustrates an example operation flow for registering passengers/drivers, according to some embodiments.

Referring now to FIG. 2, wherein an example operation flow for registering passengers/drivers, according to some embodiments, is shown. As illustrated, process 200 for registering passengers/drivers may include operations 202 through 218. The operations may be performed e.g., by a client device 103 (in particular, reservation client 142) and cloud server(s) 108 (in particular, user management subsystem 134). In alternate embodiments, some of the operations may be combined, split or performed in different orders.

Process 200 may begin at 202. At 202, a request to create a user account and register a passenger/driver may be submitted, from a client device 103 of a passenger/driver 102 to cloud server(s) 108. The request may include various data of the passenger/driver 102, e.g., name, home or business address, email address, telephone numbers, credit care or bank account information, and so forth. The request may be sent from client device 103 to cloud server(s) 108 in one or more messages. On receipt of the various data of the passenger/driver 102, at 204, the user account may be created and the user information stored, by cloud server(s) 108.

On creation of the account, at 206, optionally, other users, e.g., family members or colleagues may be added to the account as other passengers/drivers. At 208, on receipt of information about the additional users (passengers/drivers), the user account may be updated, by cloud server(s) 108.

Similarly, on creation of the account, at 210, data collection, retention and sharing preferences may be specified for the primary user (passenger/driver). At 212, on receipt of the data collection, retention and sharing preferences of the primary user (passenger/driver), the user account may be updated with the provided preferences stored, by cloud server(s) 108.

Likewise, on creation of the account, at 214, data collection, retention and sharing preferences may be specified for the other users (passengers/drivers) of the account. At 216, on receipt of the data collection, retention and sharing preferences of the other users (passengers/drivers) of the account, the user account may be updated with the provided preferences stored, by cloud server(s) 108.

Lastly, at 218, the passenger/driver may log out and terminate the registration session.

Figure 3:
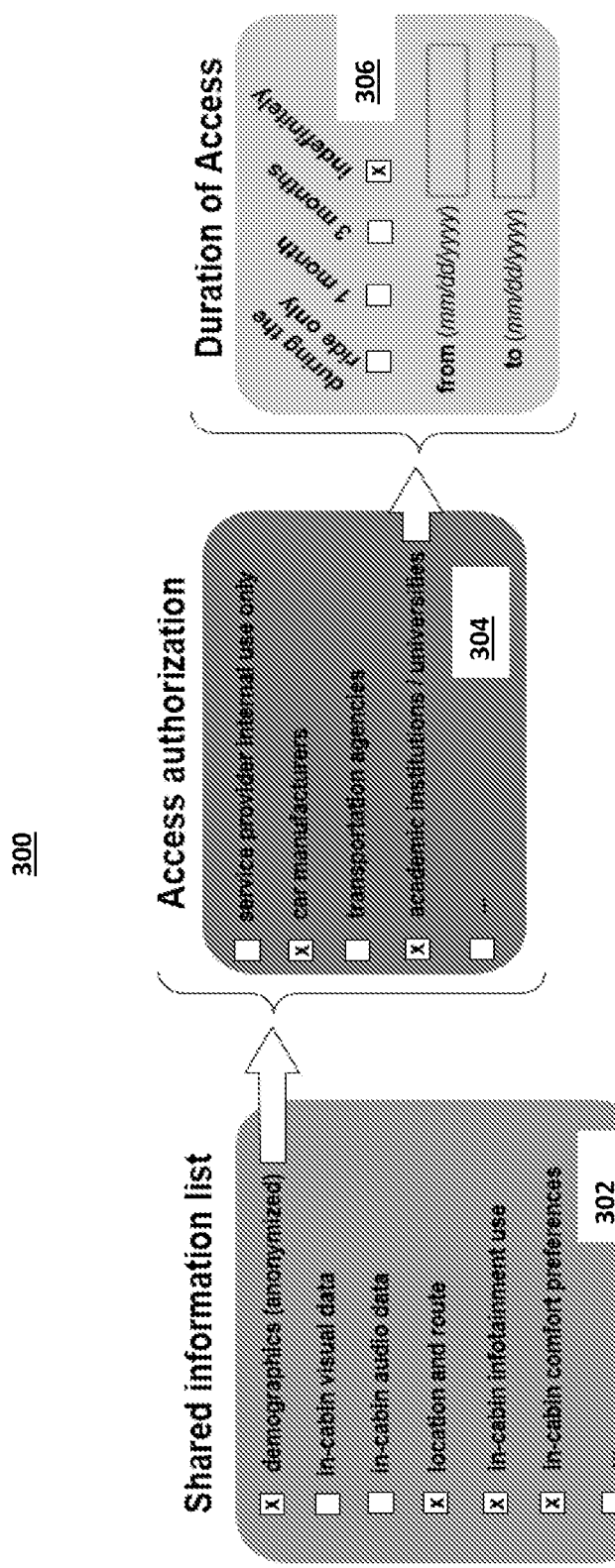
FIG. 3 illustrates an example interface for passengers/drivers to specify data privacy preferences, according to various embodiments.

Referring now to FIG. 3, wherein an example interface for passengers/drivers to specify data privacy preferences, according to various embodiments, is shown. As illustrated, the example interface 300 for specifying data privacy preferences of a passenger/driver may include three screen instances 302-306. Screen instance 302 may allow a passenger/driver to specify whether demographic data (anonymized), in-cabin visual data, in-cabin audio data, location and route data, in-cabin infotainment usage data, in-cabin comfort preference data, and so forth associated with the passenger/driver be shared. Screen instance 304 may allow a passenger/driver to specify whether the service provider of the autonomous/semi-autonomous vehicles 104, vehicle manufacturers, transportation agencies, academic institutions, and so forth may have authorization to access the collected information, in other words, whether the collected data may be shared with these entities. Screen instance 306 may allow a passenger/driver to specify the duration of access of the data collected, e.g., during the ride only, 1 month, 3 month, indefinitely (until authorization is revoked), or for a specific date range, in other words, the duration of permissible retention (and therefore, sharing) of the data collected.

Figure 4:
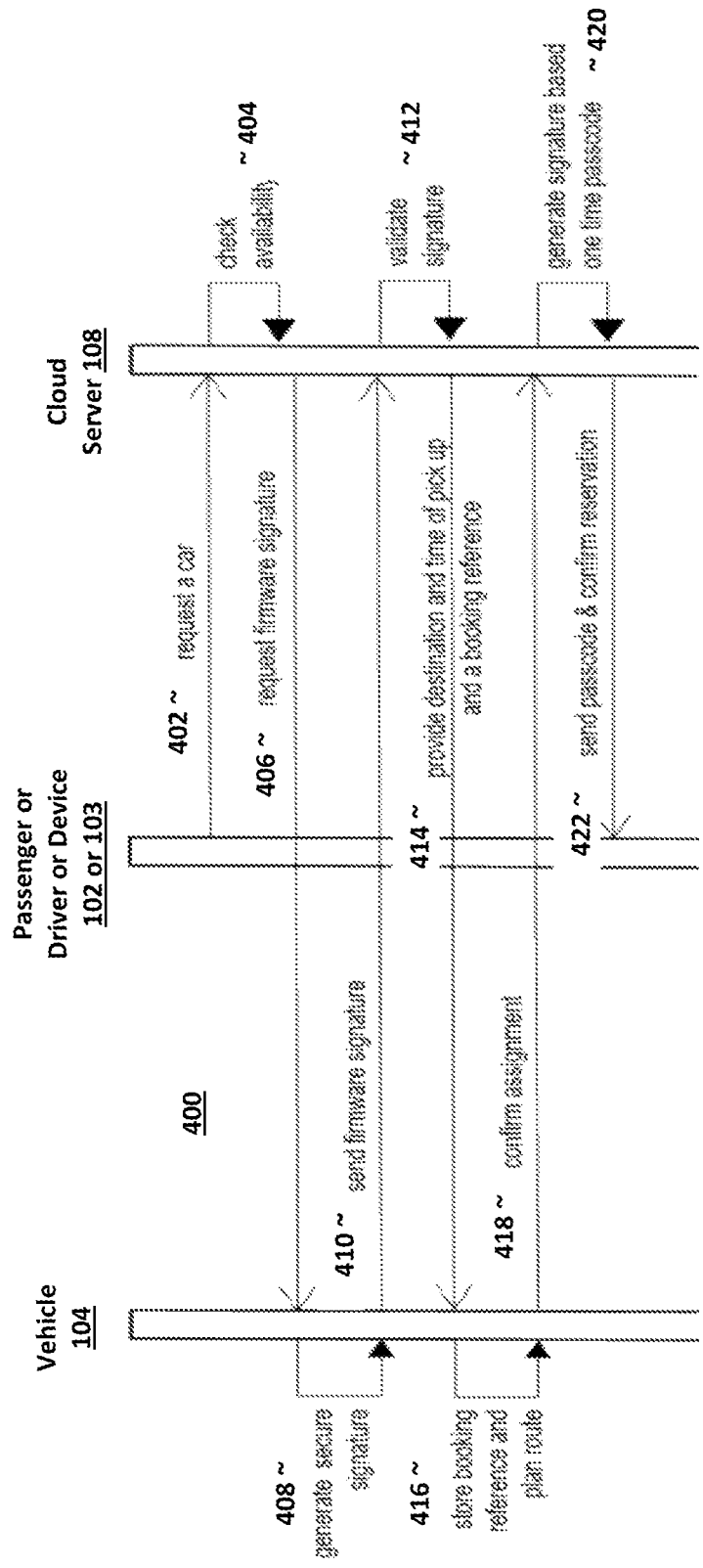
FIG. 4 illustrates an example operation flow for reserving autonomous/semi-autonomous vehicles, according to some embodiments.

Referring now to FIG. 4, wherein an example operation flow for reserving autonomous/semi-autonomous vehicles, according to some embodiments, is shown. As illustrated, process 400 for reserving autonomous/semi-autonomous vehicles may include operations 402-422. The operations may be performed e.g., by an autonomous/semi-autonomous vehicle 104 (in particular, management system 112), a client device 103 (in particular, reservation client 142), and cloud server(s) 108 (in particular, reservation subsystem 132). In alternate embodiments, some of the operations may be combined, split or perform in different orders.

Process 400 may start at 402. At 402, a request for an autonomous/semi-autonomous vehicle may be submitted, from client device 103 to cloud server(s) 108. In embodiments, the request may include destination, date/time vehicle is needed, pick up location, and so forth.

At 404, availability of autonomous/semi-autonomous vehicles to fill the request may be checked, by cloud server(s) 108. At 406, on identifying an available autonomous/semi-autonomous vehicle 104 suitable for filling the request, a request for the unique signature of the autonomous/semi-autonomous vehicle 104 may be sent from the cloud server(s) 108 to the autonomous/semi-autonomous vehicle 104. In embodiments, the unique signature of the autonomous/semi-autonomous vehicle 104 may be a unique firmware signature.

At 408, on receipt of the request, the unique signature may be retrieved or generated, by the autonomous/semi-autonomous vehicle 104. In embodiments, the unique firmware signature is securely generated. At 410, on retrieval or generation, the unique signature may be sent to the cloud server(s) 108, by the autonomous/semi-autonomous vehicle 104.

At 412, on receipt of the unique signature from the autonomous/semi-autonomous vehicle 104, the cloud server(s) 108 may validate the unique signature. At 414, on validation of the received signature, the reservation may be transmitted to the autonomous/semi-autonomous vehicle 104, by the cloud server(s) 108. The reservation may include data such as destination, time and location of pick up, a reservation/booking reference, and so forth.

At 416, on receipt of the reservation, the autonomous/semi-autonomous vehicle 104 may store the received reservation. In embodiments, the autonomous/semi-autonomous vehicle 104 (equipped with a navigation system) may also pre-plan the route from the pick up location to the destination. At 418, the autonomous/semi-autonomous vehicle 104 may acknowledge (confirm) acceptance of the assignment of the reservation.

At 420, the cloud server(s) 108 may generate the expected passcode for the autonomous/semi-autonomous vehicle 104 to demonstrate trustworthiness to the passenger/driver 102 with respect to compliance with the data privacy requirements of the passenger/driver 102. The expected passcode may be generated in any one of a number of challenge-response authentication mechanism (CRAM), such as Challenge-Handshake Authentication Protocol (CHAP), Pre-shared Key Extensible Authentication Protocol (EAP-PSK), and so forth. In embodiments, the expected pass code is generated based at least in part on the unique signature of the autonomous/semi-autonomous vehicle 104, and the reservation. At 422, the expected passcode may be provided to the client device 103, by the cloud server(s) 108.

Figure 5:
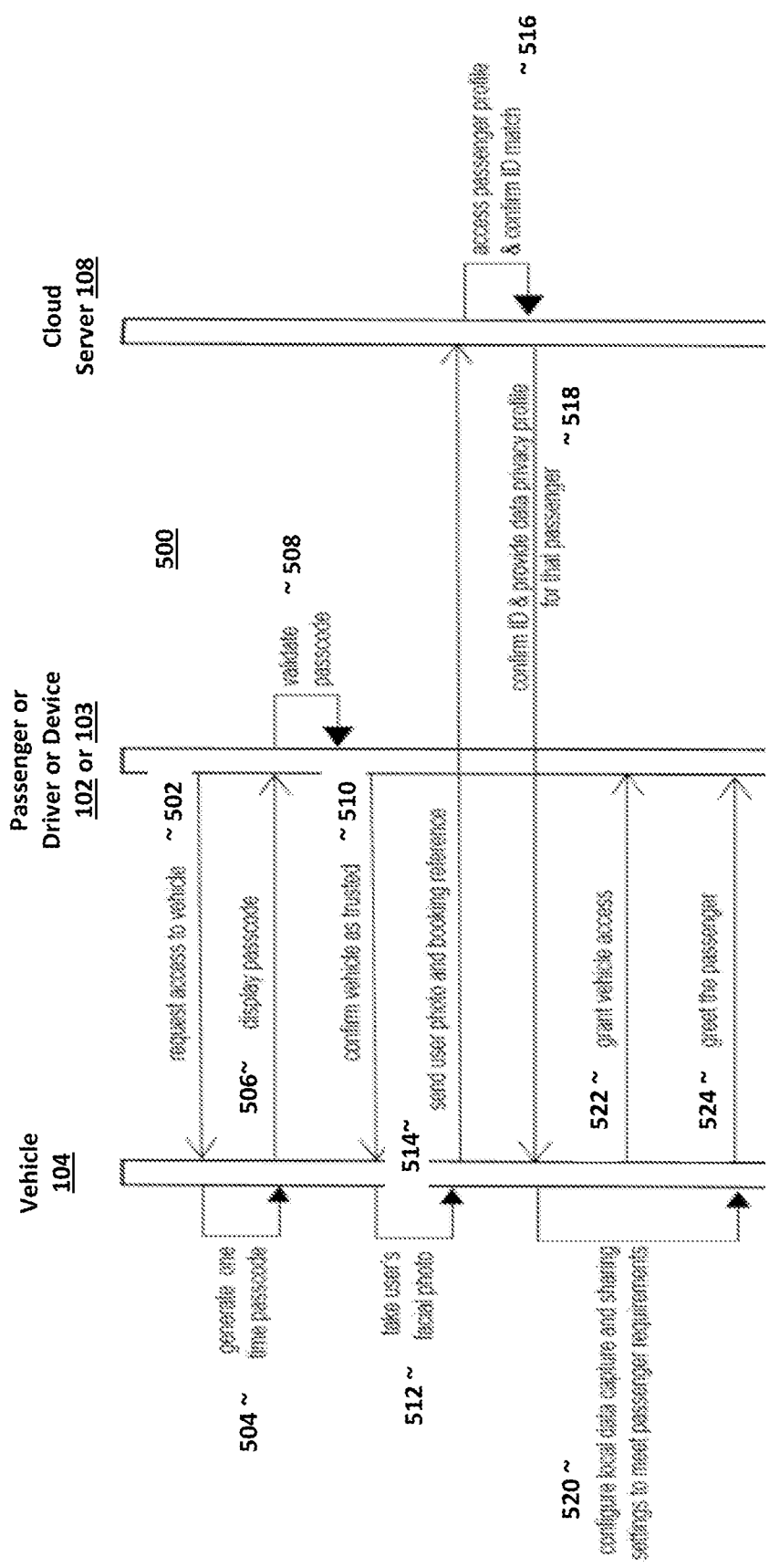
FIG. 5 illustrates an example operation flow for exercising a reservation with trusted data collection and/or sharing, according to some embodiments.

Referring now to FIG. 5, wherein an example operation flow for exercising a reservation with trusted data collection, retention, and/or sharing, according to some embodiments. The operations may be performed e.g., by a client device 103 (in particular, reservation client 142), cloud server 108 (in particular, user management subsystem 134), and an autonomous/semi-autonomous vehicle 104 (in particular, access control subsystem 124). In alternate embodiments, some of the operations may be combined, split or perform in different orders.

Process 500 may start at 502. At 502, a request to access may be provided to an autonomous/semi-autonomous vehicle 104. The request may be provided to the autonomous/semi-autonomous vehicle 104 from a client device 103, or directly to the autonomous/semi-autonomous vehicle 104 with the passenger/driver 102 interacting with an I/O device 116 of the autonomous/semi-autonomous vehicle 104.

At 504, in response to the request to access, the autonomous/semi-autonomous vehicle 104 (e.g., the trust function of access control subsystem 123) may generate the passcode expected by the passenger/driver 102, to demonstrate the autonomous/semi-autonomous vehicle 104 can be trusted with respect to compliance with the data privacy requirements of the passenger/driver 102. In embodiments, the trust function of access control subsystem 123 may be configured with passcode generation logic that is complementary the passcode generation logic of cloud server 108.

At 506, the generated expected passcode may be provided to the passenger/driver 102. In embodiments, the generated expected passcode may be transmitted to the client device 103 and displayed on the client device 103. In other embodiments, the generated expected passcode may be displayed on an I/O device 116 of the autonomous/semi-autonomous vehicle 104.

At 508, the passenger/driver may make a determination on whether the autonomous/semi-autonomous vehicle 104 provided the correct passcode to demonstrate its trust worthiness. At 510, a confirmation of the passenger/driver's trust may be provided to the autonomous/semi-autonomous vehicle 104. In some embodiments, an acknowledgement request may be provided by the autonomous/semi-autonomous vehicle 104 along with the generated expected passcode. For these embodiments, the confirmation may be provided in the form of the requested acknowledgement.

Next, at 512, bio-metric data, such as photo, fingerprints, voice prints, and so forth, of the passenger/driver 102 may be collected by corresponding camera, fingerprint reader or voice recorder of the autonomous/semi-autonomous vehicle 104. At 514, the collected bio-metric data, together with the reservation/booking reference may be sent from the autonomous/semi-autonomous vehicle 104 to the cloud server(s) 108.

At 516, on receipt of the bio-metric data, the cloud server(s) 108 (e.g., user management subsystem 134 may access its passenger/driver database to confirm the identity of the passenger/driver, that the person is indeed a registered passenger/driver. On confirmation of the identity of the passenger/driver (and optionally, its current registration status), the data privacy profile of the passenger/driver 102 may be retrieved. At 518, a confirmation message along with the data privacy profile of the passenger/driver 102 may be provided (sent) from cloud server(s) 108 to the autonomous/semi-autonomous vehicle 104.

At 520, on receipt of the data privacy profile of the passenger/driver 102, the autonomous/semi-autonomous vehicle 104 may configure itself (e.g., data collection and sharing subsystem 126) accordingly, to ensure it operates in a manner that complies with the data privacy requirements specified in the data privacy profile of the passenger/driver 102. Additionally, at 522, access to the autonomous/semi-autonomous vehicle 104 may be granted to the passenger/driver 102. Further, in embodiments, a general or personalized greeting to welcome the passenger/driver 102 may be generated or outputted.

Figure 6:
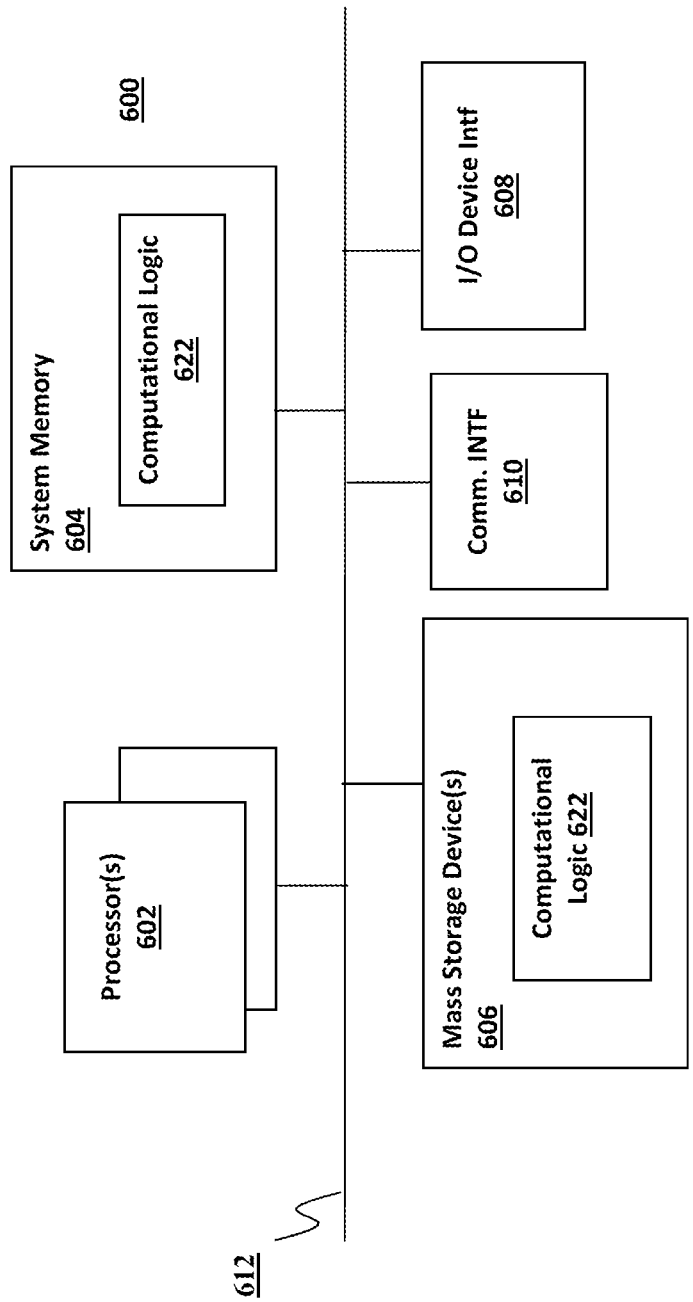
FIG. 6 illustrates an example apparatus suitable for use as an onboard system to host a management system, as a cloud server, or as a client device, in accordance with various embodiments.

Referring now to FIG. 6, wherein a block diagram of a computer system suitable for use as an onboard system to host a management system, as a cloud server, or as a client device to practice the present disclosure, in accordance with various embodiments, is illustrated. As shown, computer device 600 may include one or more processors 602, and system memory 604. Each processor 602 may include one or more processor cores. System memory 604 may include any known volatile or non-volatile memory.

Additionally, computer device 600 may include mass storage device(s) 606 (such as solid state drives), input/output device interface 608 (to interface with various input/output devices, such as, mouse, cursor control, display device (including touch sensitive screen), and so forth) and communication interfaces 610 (such as network interface cards, modems and so forth). In embodiments, communication interfaces 610 may support wired or wireless communication, including near field communication. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the executable code of the programming instructions of management system 112 (including reservation subsystem 122, access control subsystem 124, data collection and sharing subsystem 126) if computer system 600 is used to implement an on-board system for the autonomous/semi-autonomous vehicle 104; or a working copy and a permanent copy of the executable code of the programming instructions of reservation subsystem 132 and user management subsystem 134 if computer system 600 is used as a cloud server 108. In other embodiments, system memory 604 and mass storage device(s) 606 may be employed to store a working copy and a permanent copy of the executable code of the programming instructions of reservation client 142 if computer system 600 is used as client device 103. The programming instructions may comprise assembler instructions supported by processor(s) 602 or high-level languages, such as, for example, C, that can be compiled into such instructions.

The permanent copy of the executable code of the programming instructions may be placed into permanent mass storage device(s) 606 in the factory, or in the field, through, for example, a distribution medium (not shown), such as a compact disc (CD), or through communication interface 610 (from a distribution server (not shown)).

The number, capability and/or capacity of these elements 610-612 may vary, depending on the intended use of example computer system 600, e.g., whether example computer system 600 is used as an on-board system of the autonomous/semi-autonomous vehicle 104, a cloud server 108, or a client device 103. The constitutions of these elements 510-512 are otherwise known, and accordingly will not be further described.

Figure 7:
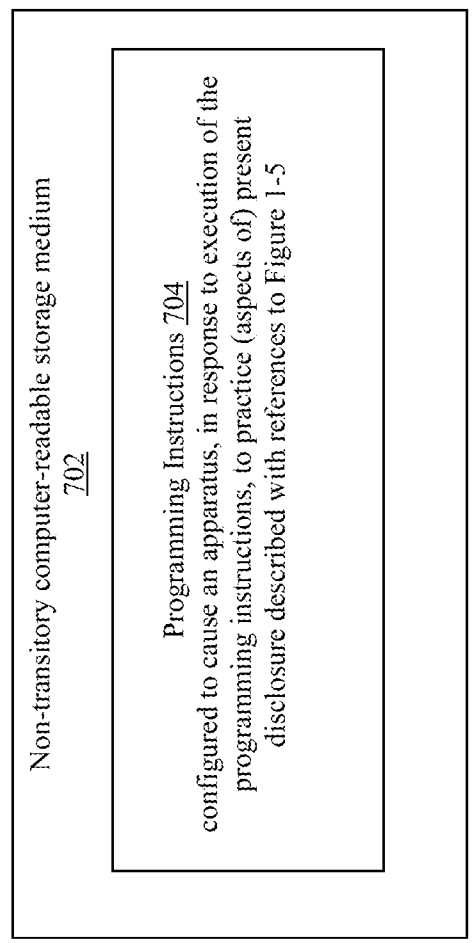
FIG. 7 illustrates an example computer readable medium with instructions configured to enable an onboard system, a cloud server, or a client device to practice aspects of the present disclosure, in accordance with various embodiments.

FIG. 7 illustrates an example non-transitory computer-readable medium having instructions configured to practice all or selected ones of the operations associated with management system 112 (including reservation subsystem 122, access control subsystem 124, data collection and sharing subsystem 126) of an autonomous/semi-autonomous vehicle 104, reservation subsystem 132 and user management subsystem 134 of cloud server(s) 108 or reservation client 142 of a client device 103, earlier described, in accordance with various embodiments. As illustrated, non-transitory computer-readable medium 702 may include a number of programming instructions 704. Programming instructions 704 may be configured to enable an apparatus, e.g., an on-board system in a vehicle 104, a cloud server 108, or a client device 103, in response to execution of the programming instructions, to perform various operations earlier described. In alternate embodiments, programming instructions 704 may be disposed on multiple non-transitory computer-readable storage media 702 instead. In still other embodiments, programming instructions 704 may be encoded in transitory computer readable signals.

Referring also to FIG. 6, for some embodiments, processor 602 may be packaged together with a computer-readable medium having programming instructions 704 configured to practice all or selected aspects of beverage dispensing related operations earlier described. For one embodiment, processor 602 may be packaged together with a computer-readable medium having programming instructions 704 to form a System in Package (SiP). For one embodiment, processor 602 may be integrated on the same die with a computer-readable medium having programming instructions 704. For one embodiment, processor 602 may be packaged together with a computer-readable medium having programming instructions 704 to form a System on Chip (SoC).

Thus, apparatuses, methods and computer-readable medium associated with autonomous/semi-autonomous driving with trusted data collection, retention and/or sharing have been described. While for ease of understanding, the trust data collection, retention and/or sharing technology have been described for autonomous/semi-autonomous driving, the technology may also be practiced with traditional non-autonomous manual vehicles equipped with on-board system as described.

Example 1 may be an apparatus for autonomous or semi-autonomous driving, comprising: a management system to be disposed in an autonomous or semi-autonomous vehicle, wherein the management system may include a reservation subsystem to receive, from a cloud server, a reservation of the autonomous or semi-autonomous vehicle for a passenger or a driver, and an access control subsystem to control access to the autonomous or semi-autonomous vehicle that may include a trust function to gain trust of the passenger or driver with respect to the passenger or driver's data privacy requirements will be met, when the passenger or driver attempts to exercise the reservation.

Example 2 may be example 1, wherein the received reservation may include data on destination, time of reservation, and a reservation reference.

Example 3 may be example 1, wherein the reservation subsystem may further generate and provide a signature of the autonomous or semi-autonomous vehicle, and provide the signature to the cloud server, in response to a request of the cloud server, prior to receipt of the reservation.

Example 4 may be example 1, wherein the trust function, in response to the passenger or driver's attempt to exercise the reservation, may generate and provide an expected passcode to the passenger or driver.

Example 5 may be example 4, wherein the trust function may generate the expected passcode based at least in part on a time of reservation and a unique signature of the autonomous or semi-autonomous vehicle.

Example 6 may be any one of examples 1-5, wherein the access control subsystem may further obtain bio-metric data of the passenger or driver, and provide the bio-metric data of the passenger or driver to the cloud server.

Example 7 may be example 6, wherein the bio-metric data of the passenger or driver may comprise a photo, fingerprint, or voice print of the passenger or driver.

Example 8 may be example 6, wherein the access control subsystem may further receive from the cloud server, in response to the provision of the bio-metric data of the passenger or driver, a data privacy profile of the passenger or driver, when the provided bio-metric data match bio-metric data of the passenger or driver known to the cloud server.

Example 9 may be example 8, wherein the management system may further comprise a data collection and sharing subsystem to collect and share data about the passenger or driver, and the passenger or driver's usage of the autonomous or semi-autonomous vehicle, based at least in part on the data privacy profile of the passenger or driver provided by the cloud server.

Example 10 may be example 8, wherein the data privacy profile may comprise one or more specifications that denote whether collection or sharing of demographic data, in-cabin visual data, in-cabin audio data, location and route data, in-cabin infotainment usage data, or in-cabin comfort preference data associated with the passenger or driver, are permitted.

Example 11 may be example 8, wherein the data privacy profile may comprise one or more specifications that denote whether sharing of collected data associated with the passenger or driver, with a service provider of the autonomous or semi-autonomous vehicle, vehicle manufacturers, transportation agencies, or academic institutions, are permitted.

Example 12 may be a method for autonomous or semi-autonomous driving, comprising: receiving, by an autonomous or semi-autonomous vehicle, from a cloud server, a reservation of the autonomous or semi-autonomous vehicle for a passenger or a driver; and controlling, by the autonomous or semi-autonomous vehicle, access to the autonomous or semi-autonomous vehicle, including gaining trust of the passenger or driver with respect to the passenger or driver's data privacy requirements will be met, when the passenger or driver attempts to exercise the reservation.

Example 13 may be example 12, further comprising, generating and providing, in response to the passenger or driver's attempt to exercise the reservation, by the autonomous or semi-autonomous vehicle, an expected passcode to the passenger or driver.

Example 14 may be example 13, wherein generating the expected passcode may comprise generating the expected passcode, based at least in part on a time of reservation and a unique signature of the autonomous or semi-autonomous vehicle.

Example 15 may be any one of examples 12-14, further comprising obtaining, by the autonomous or semi-autonomous vehicle, bio-metric data of the passenger or driver, and providing, by the autonomous or semi-autonomous vehicle, the bio-metric data of the passenger or driver to the cloud server.

Example 16 may be example 15, further comprising receiving, by the autonomous or semi-autonomous vehicle, from the cloud server, in response to the provision of the bio-metric data of the passenger or driver, a data privacy profile of the passenger or driver, when the provided bio-metric data match bio-metric data of the passenger or driver known to the cloud server.

Example 17 may be example 15, further comprising collecting, retaining, or sharing, by the autonomous or semi-autonomous vehicle, data about the passenger or driver, and the passenger or driver's usage of the autonomous or semi-autonomous vehicle, based at least in part on the data privacy profile of the passenger or driver provided by the cloud server.

Example 18 may be one or more computer-readable storage medium (CRM) comprising a plurality of instructions to cause an apparatus for autonomous or semi-autonomous driving disposed in an autonomous or semi-autonomous vehicle, in response to execution of the instructions a processor of the apparatus, to operate a management system to: receive, from a cloud server, a reservation of the autonomous or semi-autonomous vehicle for a passenger or a driver, and control access to the autonomous or semi-autonomous vehicle that may include gaining trust of the passenger or driver with respect to the passenger or driver's data privacy requirements will be met, when the passenger or driver attempts to exercise the reservation.

Example 19 may be example 18, wherein the apparatus may be further caused to generate and provide an expected passcode to the passenger or driver, in response to the passenger or driver's attempt to exercise the reservation.

Example 20 may be example 19, wherein the apparatus is caused to generate the expected passcode based at least in part on a time of reservation and a unique signature of the autonomous or semi-autonomous vehicle.

Example 21 may be any one of examples 18-20, wherein the apparatus is caused to obtain bio-metric data of the passenger or driver, and provide the bio-metric data of the passenger or driver to the cloud server.

Example 22 may be example 21, wherein the apparatus may be further caused to receive from the cloud server, in response to the provision of the bio-metric data of the passenger or driver, a data privacy profile of the passenger or driver, when the provided bio-metric data match bio-metric data of the passenger or driver known to the cloud server.

Example 23 may be example 22, wherein the apparatus may be further caused to collect, retain or share data about the passenger or driver, and the passenger or driver's usage of the autonomous or semi-autonomous vehicle, based at least in part on the data privacy profile of the passenger or driver provided by the cloud server.

Example 24 may be an apparatus for autonomous or semi-autonomous driving, comprising: a management system to be disposed in an autonomous or semi-autonomous vehicle, wherein the management system may include reservation means for receiving, from a cloud server, a reservation of the autonomous or semi-autonomous vehicle for a passenger or a driver, and access control means for controlling access to the autonomous or semi-autonomous vehicle that may include trust means for gaining trust of the passenger or driver with respect to the passenger or driver's data privacy requirements will be met, when the passenger or driver attempts to exercise the reservation.

Example 25 may be example 24, wherein the trust means may comprise means for generating and providing an expected passcode to the passenger or driver, in response to the passenger or driver's attempt to exercise the reservation.

Example 26 may be example 25, wherein the trust means may comprise means for generating the expected passcode based at least in part on a time of reservation and a unique signature of the autonomous or semi-autonomous vehicle.

Example 27 may be any one of examples 24-26, wherein the access control means may comprise means for obtaining bio-metric data of the passenger or driver, and provide the bio-metric data of the passenger or driver to the cloud server.

Example 28 may be example 27, wherein the access control means may further comprise means for receiving from the cloud server, in response to the provision of the bio-metric data of the passenger or driver, a data privacy profile of the passenger or driver, when the provided bio-metric data match bio-metric data of the passenger or driver known to the cloud server.

Example 29 may be example 28, wherein the management system may further comprise data collection and sharing means for collecting and sharing data about the passenger or driver, and the passenger or driver's usage of the autonomous or semi-autonomous vehicle, based at least in part on the data privacy profile of the passenger or driver provided by the cloud server.

Example 30 may be a server apparatus for autonomous or semi-autonomous driving, comprising: a communication subsystem to communicate with passengers or drivers, and autonomous or semi-autonomous vehicles; a reservation subsystem coupled with the communication subsystem to manage reservations of the autonomous or semi-autonomous vehicles by the passengers or drivers, that may include generation and provision of expected passcodes for the passengers or drivers for respective reservations for use by the autonomous or semi-autonomous vehicles to establish trust with the passengers or drivers with respect to meeting data privacy requirements of the passengers or drivers; and a user management subsystem to manage the data privacy requirements of the passengers or drivers that may include provision of the data privacy requirements of the passengers or drivers to respective reserved autonomous or semi-autonomous vehicles; wherein the respective reserved autonomous or semi-autonomous vehicles use the provided data privacy requirements to regulate collection, retention or sharing of data associated with the passengers or drivers.

Example 31 may be example 30, wherein the reservation subsystem may generate an expected passcode for a reservation of a passenger or driver, based at least in part on a unique signature of the autonomous or semi-autonomous vehicle being reserved.

Example 32 may be example 30, wherein the user management subsystem may provide a data privacy profile of a passenger or driver having the data privacy requirements of the passenger or driver to an autonomous or semi-autonomous vehicle reserved for the passenger or driver, in response to receipt of bio-metric data of the passenger or driver from an autonomous or semi-autonomous vehicle.

Example 33 may be any one of examples 30-32, wherein the user management subsystem may further register the passengers or drivers, and receive data privacy preferences of the passengers or drivers.

Example 34 may be a method for autonomous or semi-autonomous driving, comprising: managing, by a cloud server, reservations of autonomous or semi-autonomous vehicles by passengers or drivers, that may include generating and providing expected passcodes for the passengers or drivers for respective reservations for use by the autonomous or semi-autonomous vehicles to establish trust with the passengers or drivers with respect to meeting data privacy requirements of the passengers or drivers; and managing, by the cloud server, the data privacy requirements of the passengers or drivers that may include providing the data privacy requirements of the passengers or drivers to respective reserved autonomous or semi-autonomous vehicles; wherein the respective reserved autonomous or semi-autonomous vehicles use the provided data privacy requirements to regulate collection, retention, or sharing of data associated with the passengers or drivers.

Example 35 may be example 34, wherein generating an expected passcode for a reservation of a passenger or driver, is based at least in part on a unique signature of the autonomous or semi-autonomous vehicle being reserved.

Example 36 may be example 34, further comprising providing, by the cloud server, a data privacy profile of a passenger or driver having the data privacy requirements of the passenger or driver to an autonomous or semi-autonomous vehicle reserved for the passenger or driver, in response to receipt of bio-metric data of the passenger or driver from the autonomous or semi-autonomous vehicle.

Example 37 may be any one of examples 34-36, further comprising registering the passengers or drivers, and receiving data privacy preferences of the passengers or drivers.

Example 38 may be one or more computer-readable storage medium (CRM) comprising a plurality of instructions to cause a cloud server for autonomous or semi-autonomous driving, in response to execution of the instructions a processor of the apparatus, to: manage reservations of the autonomous or semi-autonomous vehicles by the passengers or drivers, that may include generation and provision of expected passcodes for the passengers or drivers for respective reservations for use by the autonomous or semi-autonomous vehicles to establish trust with the passengers or drivers with respect to meeting data privacy requirements of the passengers or drivers; and manage the data privacy requirements of the passengers or drivers that may include provision of the data privacy requirements of the passengers or drivers to respective reserved autonomous or semi-autonomous vehicles; wherein the respective reserved autonomous or semi-autonomous vehicles use the provided data privacy requirements to regulate collection, retention, or sharing of data associated with the passengers or drivers.

Example 39 may be example 38, wherein the cloud server is caused to generate an expected passcode for a reservation of a passenger or driver, based at least in part on a unique signature of the autonomous or semi-autonomous vehicle being reserved.

Example 40 may be example 38, wherein the cloud server is caused to provide a data privacy profile of a passenger or driver having the data privacy requirements of the passenger or driver to an autonomous or semi-autonomous vehicle reserved for the passenger or driver, in response to receipt of bio-metric data of the passenger or driver from an autonomous or semi-autonomous vehicle.

Example 41 may be any one of examples 38-40, wherein the cloud server may be further caused to register the passengers or drivers, and receive data privacy preferences of the passengers or drivers.

Example 42 may be example an apparatus for autonomous or semi-autonomous driving, comprising: means for managing reservations of autonomous or semi-autonomous vehicles by passengers or drivers, that may include means for generating and providing expected passcodes for the passengers or drivers for respective reservations for use by the autonomous or semi-autonomous vehicles to establish trust with the passengers or drivers with respect to meeting data privacy requirements of the passengers or drivers; and means for managing the data privacy requirements of the passengers or drivers that may include means for providing the data privacy requirements of the passengers or drivers to respective reserved autonomous or semi-autonomous vehicles; wherein the respective reserved autonomous or semi-autonomous vehicles use the provided data privacy requirements to regulate collection, retention, or sharing of data associated with the passengers or drivers.

Example 43 may be example 42, wherein means for generating may comprise means for generating an expected passcode for a reservation of a passenger or driver, is based at least in part on a unique signature of the autonomous or semi-autonomous vehicle being reserved.

Example 44 may be example 42, further comprising means for providing a data privacy profile of a passenger or driver having the data privacy requirements of the passenger or driver to an autonomous or semi-autonomous vehicle reserved for the passenger or driver, in response to receipt of bio-metric data of the passenger or driver from the autonomous or semi-autonomous vehicle.

Example 45 may be any one of examples 42-44, further comprising means for registering the passengers or drivers, and means for receiving data privacy preferences of the passengers or drivers.

Example 46 may be example an apparatus for autonomous or semi-autonomous driving, comprising: a processor; and a reservation client operated by the processor to provide data privacy preferences of a passenger or a driver to a cloud server; wherein the cloud server provides the data privacy preferences to an autonomous or semi-autonomous vehicle on confirmation of identity of the passenger or driver, in response to bio-metric data of the passenger or driver provided by the autonomous or semi-autonomous vehicle; wherein the bio-metric data of the passenger or driver are provided by the autonomous or semi-autonomous vehicle to the cloud server, in response to an attempt of the passenger or driver to gain access to the autonomous or semi-autonomous vehicle, when exercising a reservation of the autonomous or semi-autonomous vehicle; wherein the autonomous or semi-autonomous vehicle collect, retain or share data associated with the passenger or driver in compliance with the data privacy preferences.

Example 47 may be example 46, wherein the reservation client may be further operated by the processor to contact the cloud server to reserve the autonomous or semi-autonomous vehicle for the passenger or driver; and wherein the reservation client may receive an expected passcode from the cloud server for the autonomous or semi-autonomous vehicle to gain trust of the passenger or driver with respect to the data privacy preferences of the passenger or driver will be complied; wherein the autonomous or semi-autonomous vehicle may also provide the same passcode to the passenger or driver, when the passenger or driver attempts to access the autonomous or semi-autonomous vehicle in exercise of the reservation.

Example 48 may be a method for autonomous or semi-autonomous driving, comprising: providing, by a reservation agent operated by a processor of a client device, to a cloud server, data privacy preferences of a passenger or a driver; and making, by the reservation agent, with the cloud server, a reservation for an autonomous or semi-autonomous vehicle for the passenger or driver; wherein the cloud server provides the data privacy preferences to the autonomous or semi-autonomous vehicle on confirmation of identity of the passenger or driver, in response to bio-metric data of the passenger or driver provided by the autonomous or semi-autonomous vehicle; wherein the bio-metric data of the passenger or driver are provided by the autonomous or semi-autonomous vehicle to the cloud server, in response to an attempt of the passenger or driver to gain access to the autonomous or semi-autonomous vehicle, when exercising a reservation of the autonomous or semi-autonomous vehicle; wherein the autonomous or semi-autonomous vehicle collect, retain or share data associated with the passenger or driver in compliance with the data privacy preferences.

Example 49 may be example 48, further comprising receiving, by the reservation agent, from the cloud server, an expected passcode for the autonomous or semi-autonomous vehicle to gain trust of the passenger or driver with respect to the data privacy preferences of the passenger or driver will be complied; wherein the autonomous or semi-autonomous vehicle may also provide the same passcode to the passenger or driver, when the passenger or driver attempts to access the autonomous or semi-autonomous vehicle in exercise of the reservation.

Example 50 may be one or more computer readable medium (CRM) having a plurality of instructions to cause a client device, in response to execution of the instructions by the client device, to implement a reservation client to provide data privacy preferences of a passenger or a driver to a cloud server; wherein the cloud server provides the data privacy preferences to an autonomous or semi-autonomous vehicle on confirmation of identity of the passenger or driver, in response to bio-metric data of the passenger or driver provided by the autonomous or semi-autonomous vehicle; wherein the bio-metric data of the passenger or driver are provided by the autonomous or semi-autonomous vehicle to the cloud server, in response to an attempt of the passenger or driver to gain access to the autonomous or semi-autonomous vehicle, when exercising a reservation of the autonomous or semi-autonomous vehicle; wherein the autonomous or semi-autonomous vehicle collect, retain or share data associated with the passenger or driver in compliance with the data privacy preferences.

Example 51 may be example 50, wherein the reservation client may further contact the cloud server to reserve the autonomous or semi-autonomous vehicle for the passenger or driver; and wherein the reservation client may receive an expected passcode from the cloud server for the autonomous or semi-autonomous vehicle to gain trust of the passenger or driver with respect to the data privacy preferences of the passenger or driver will be complied; wherein the autonomous or semi-autonomous vehicle may also provide the same passcode to the passenger or driver, when the passenger or driver attempts to access the autonomous or semi-autonomous vehicle in exercise of the reservation.

Example 52 may be an apparatus for autonomous or semi-autonomous driving, comprising: means for providing to a cloud server, data privacy preferences of a passenger or a driver; and means for making with the cloud server, a reservation for an autonomous or semi-autonomous vehicle for the passenger or driver; wherein the cloud server provides the data privacy preferences to the autonomous or semi-autonomous vehicle on confirmation of identity of the passenger or driver, in response to bio-metric data of the passenger or driver provided by the autonomous or semi-autonomous vehicle; wherein the bio-metric data of the passenger or driver are provided by the autonomous or semi-autonomous vehicle to the cloud server, in response to an attempt of the passenger or driver to gain access to the autonomous or semi-autonomous vehicle, when exercising a reservation of the autonomous or semi-autonomous vehicle; wherein the autonomous or semi-autonomous vehicle collect, retain or share data associated with the passenger or driver in compliance with the data privacy preferences.

Example 53 may be example 52, further comprising means for receiving, from the cloud server, an expected passcode for the autonomous or semi-autonomous vehicle to gain trust of the passenger or driver with respect to the data privacy preferences of the passenger or driver will be complied; wherein the autonomous or semi-autonomous vehicle may also provide the same passcode to the passenger or driver, when the passenger or driver attempts to access the autonomous or semi-autonomous vehicle in exercise of the reservation.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A management apparatus disposed in an autonomous or semi-autonomous vehicle, for managing trust establishment for operation of the autonomous or semi-autonomous vehicle, the apparatus comprising:
reservation circuitry to receive, from a cloud server, a reservation of the autonomous or semi-autonomous vehicle for a user, wherein the user is an intended passenger or operator of the autonomous or semi-autonomous vehicle; and
access control circuitry to control access to the autonomous or semi-autonomous vehicle, wherein the access control circuitry is to execute a trust function to gain trust of the user with respect to meeting data privacy requirements of the user when the user attempts to exercise the reservation, wherein, to gain the trust, the trust function is to:
generate a passcode based at least in part on a unique signature that identifies the autonomous or semi-autonomous vehicle, and
provide the passcode to the user for verification of a trust relationship with the autonomous or semi-autonomous vehicle.

2. The apparatus of claim 1, wherein the received reservation includes data on destination, time of reservation, and a reservation reference.

3. The apparatus of claim 1, wherein the reservation circuitry is to generate the signature of the autonomous or semi-autonomous vehicle, and provide the signature to the cloud server in response to a request of the cloud server and prior to receipt of the reservation.

4. The apparatus of claim 1, wherein the trust function is to:
generate the passcode in response to an attempt to exercise the reservation by the user.

5. The apparatus of claim 1, wherein the trust function is to:
generate the passcode based at least in part on a time of reservation and the unique signature of the autonomous or semi-autonomous vehicle.

6. The apparatus of claim 1, wherein the unique signature is a firmware signature.

7. The apparatus of claim 1, wherein the access control circuitry is to:
obtain biometric data of the user, and provide the biometric data of the user to the cloud server, wherein the biometric data includes one or more of a photo, fingerprint, or voice print of the user.

8. The apparatus of claim 7, wherein the access control circuitry is to:
receive from the cloud server, a data privacy profile of the user when the provided biometric data match biometric data of the user known to the cloud server.

9. The apparatus of claim 8, wherein the management apparatus further comprises:
data collection and sharing circuitry to collect and share data about the user, including usage of the autonomous or semi-autonomous vehicle by the user, wherein the collection and sharing is based at least in part on the data privacy profile of the user provided by the cloud server.

10. The apparatus of claim 8, wherein the data privacy profile comprises one or more specifications that denote whether collection or sharing of one or more types of data about the user is permitted, wherein the types of data about the user include one or more of demographic data, in-cabin visual data, in-cabin audio data, location and route data, in-cabin infotainment usage data, and in-cabin comfort preference data associated with the user.

11. The apparatus of claim 8, wherein the data privacy profile comprises one or more specifications that denote services with which collected data about the user is permitted, wherein the services includes one or more of a service provider of the autonomous or semi-autonomous vehicle, vehicle manufacturers, transportation agencies, and academic institutions.

12. A method for operating an autonomous or semi-autonomous vehicle of a vehicle sharing service, the method comprising:
receiving, from a cloud server of the vehicle sharing service, a reservation of the autonomous or semi-autonomous vehicle for a user, the user being an intended passenger or driver of the autonomous or semi-autonomous vehicle; and
controlling, by the autonomous or semi-autonomous vehicle, access to the autonomous or semi-autonomous vehicle, including gaining trust of the user with respect to meeting data privacy requirements of the user when the user attempts to exercise the reservation, wherein controlling access to the autonomous or semi-autonomous vehicle includes:
generating a passcode based at least in part on a unique signature that identifies the autonomous or semi-autonomous vehicle, and
providing the passcode to the user.

13. The method of claim 12, further comprising:
generating and providing the passcode to the user in response to an attempt by the user to exercise the reservation.

14. The method of claim 13, wherein generating the expected passcode comprises:
generating the expected passcode based at least in part on a time of reservation and the unique signature of the autonomous or semi-autonomous vehicle.

15. The method of claim 12, further comprising:
obtaining, by the autonomous or semi-autonomous vehicle, biometric data of the user, and providing, by the autonomous or semi-autonomous vehicle, the biometric data of the user to the cloud server.

16. The method of claim 15, further comprising:

receiving, by the autonomous or semi-autonomous vehicle, from the cloud server, in response to the provision of the biometric data of the user, a data privacy profile of the user, when the provided biometric data match biometric data of the user known to the cloud server.

17. The method of claim 16, further comprising:

collecting, retaining, or sharing, by the autonomous or semi-autonomous vehicle, data about the user, and usage of the user of the autonomous or semi-autonomous vehicle, based at least in part on the data privacy profile of the user provided by the cloud server.

18. One or more non-transitory computer-readable storage medium (NTCRSM) comprising instructions to cause a cloud server of a vehicle subscription service, in response to execution of the instructions by one or more processors of the cloud server, to:

manage a reservation of an autonomous or semi-autonomous vehicle made by a user of the vehicle subscription service, wherein the user is an intended passenger or driver of the reserved autonomous or semi-autonomous vehicle, and management of the reservation includes:
generation of a passcode for the reservation based at least in part on a unique signature associated with the autonomous or semi-autonomous vehicle being reserved, and
provision of the passcode to the autonomous or semi-autonomous vehicle for use by the autonomous or semi-autonomous vehicle to establish trust with the user with respect to meeting data privacy requirements of the user; and manage the data privacy requirements of the user, wherein management of the data privacy requirements includes provision of the data privacy requirements of the user to the reserved autonomous or semi-autonomous vehicle, wherein the provisioned data privacy requirements control at least one of regulation, retention, and sharing of user data by the reserved autonomous or semi-autonomous vehicle.

19. The one or more NTCRSM of claim 18, wherein execution of the instructions is to cause the cloud server to:

receive biometric data of the user from the autonomous or semi-autonomous vehicle; and provide, in response to receipt of the biometric data, a data privacy profile of the user so that the autonomous or semi-autonomous vehicle can configure local settings according to the data privacy requirements in the data privacy profile of the user.

20. The one or more NTCRSM of claim 18, wherein execution of the instructions is to cause the cloud server to:

register the user; and receive data privacy preferences from the registered user.

21. One or more computer readable medium non-transitory (NTCRSM) comprising instructions to cause a client device, in response to execution of the instructions by the client device, to implement a reservation client to to:

send, to a vehicle that is part of a vehicle sharing service, an access request to access the vehicle based on exercising a reservation of the vehicle made with the vehicle sharing service;

receive, from the vehicle, a unique passcode based on the access request, wherein the unique passcode is based at least in part on a unique signature that identifies the vehicle;

send, to the vehicle, a trust indicator indicating that the vehicle is trusted based on the unique passcode;

provide, in response to the trust indicator, biometric data of a user to the vehicle, wherein the vehicle sharing service provides the vehicle with data privacy preferences associated with the user after confirmation of an identity of the user based on the provided biometric data, and the data privacy preferences are to control user data collection, retention, and sharing capabilities of the vehicle during the reservation; and receive an access acknowledgement indicating that access to the vehicle has been granted.

22. The one or more NTCRSM of claim 21, wherein execution of the instructions is to cause the client device to implement the reservation client to:

provide the data privacy preferences to the vehicle sharing service during or prior to reservation of the vehicle.

23. The one or more NTCRSM of claim 21, wherein the unique passcode is a second unique passcode, and execution of the instructions is to cause the client device to implement the reservation client to:

send, to the vehicle sharing service, a reservation request to reserve the vehicle for the user for a specified time and destination;

receive a first unique passcode from the vehicle sharing service based on the reservation request; and generate the trust indicator when the first unique passcode matches the second unique passcode.

24. The one or more NTCRSM of claim 21, wherein the unique signature that identifies the vehicle is a firmware signature generated by the vehicle.

\* \* \* \* \*

UNITED STATES PATENT AND TRADEMARK OFFICE
CERTIFICATE OF CORRECTION

| | | |
|---|---|---|
| PATENT NO. | : 11,528,275 B2 | |
| APPLICATION NO. | : 16/611354 | |
| DATED | : December 13, 2022 | |
| INVENTOR(S) | : Cagri Tanriover et al. | |

It is certified that error appears in the above-identified patent and that said Letters Patent is hereby corrected as shown below:

In the Claims

Column 22
Line 8, "...to to:" should read "...to:"

Signed and Sealed this
Fourteenth Day of March, 2023

Katherine Kelly Vidal
*Director of the United States Patent and Trademark Office*